(12) United States Patent
Tathuzaki

(10) Patent No.: US 7,308,884 B2
(45) Date of Patent: Dec. 18, 2007

(54) ROTARY ENGINE

(76) Inventor: Seiki Tathuzaki, 3-23-4, Nishu-kameari, Kathushika-ku, Tokyo (JP) 125-0002

( * ) Notice: Subject to any disclaimer, the term of this patent is extended or adjusted under 35 U.S.C. 154(b) by 0 days.

(21) Appl. No.: 11/470,496

(22) Filed: Sep. 6, 2006

(65) Prior Publication Data

US 2007/0256660 A1   Nov. 8, 2007

Related U.S. Application Data

(63) Continuation of application No. PCT/JP2006/303975, filed on Mar. 2, 2006.

(51) Int. Cl.
  F02B 53/00  (2006.01)
  F01C 1/22   (2006.01)
(52) U.S. Cl. ..................... 123/241; 123/228
(58) Field of Classification Search ............ 123/241, 123/228, 227, 237
  See application file for complete search history.

(56) References Cited

U.S. PATENT DOCUMENTS 1,349,353 A * 8/1920 Wilber, Jr. ............ 123/227
3,595,210 A   7/1971 Lampis
4,860,704 A * 8/1989 Slaughter ............. 123/237
4,967,707 A * 11/1990 Rogant .............. 123/228
6,062,188 A * 5/2000 Okamura ............ 123/228

FOREIGN PATENT DOCUMENTS

JP    60-187717   9/1985
JP    2000-240460 5/2000

* cited by examiner

*Primary Examiner*—Thomas Denion
*Assistant Examiner*—Mary A Davis
(74) *Attorney, Agent, or Firm*—Thomas E. Toner; Smith & Hopen, P.A.

(57) ABSTRACT

A circular column-shaped flywheel rotor 4 that rotates inside a rotor housing 1 in which a cylindrical-shaped hollow section is formed; a piston head 34 that is located on the flywheel rotor 4 so that it can come in sliding contact with the inner peripheral wall of the rotor housing 1 or be released from sliding contact; an intake valve 10 and airtight-sealing valve 21 that are constructed so that they are capable of partitioning and dividing a combustion chamber or opening up the combustion chamber; a spark plug 16; and an exhaust valve 28 that is located so that it is capable of connecting or disconnecting the combustion chamber with the outside; and whereby linking these components with the rotating movement of the piston head 34, performs air intake, compression, combustion expansion (explosion) and exhaust, to obtain rotational power output from the output shaft 6 that supports the flywheel rotor 4.

7 Claims, 18 Drawing Sheets

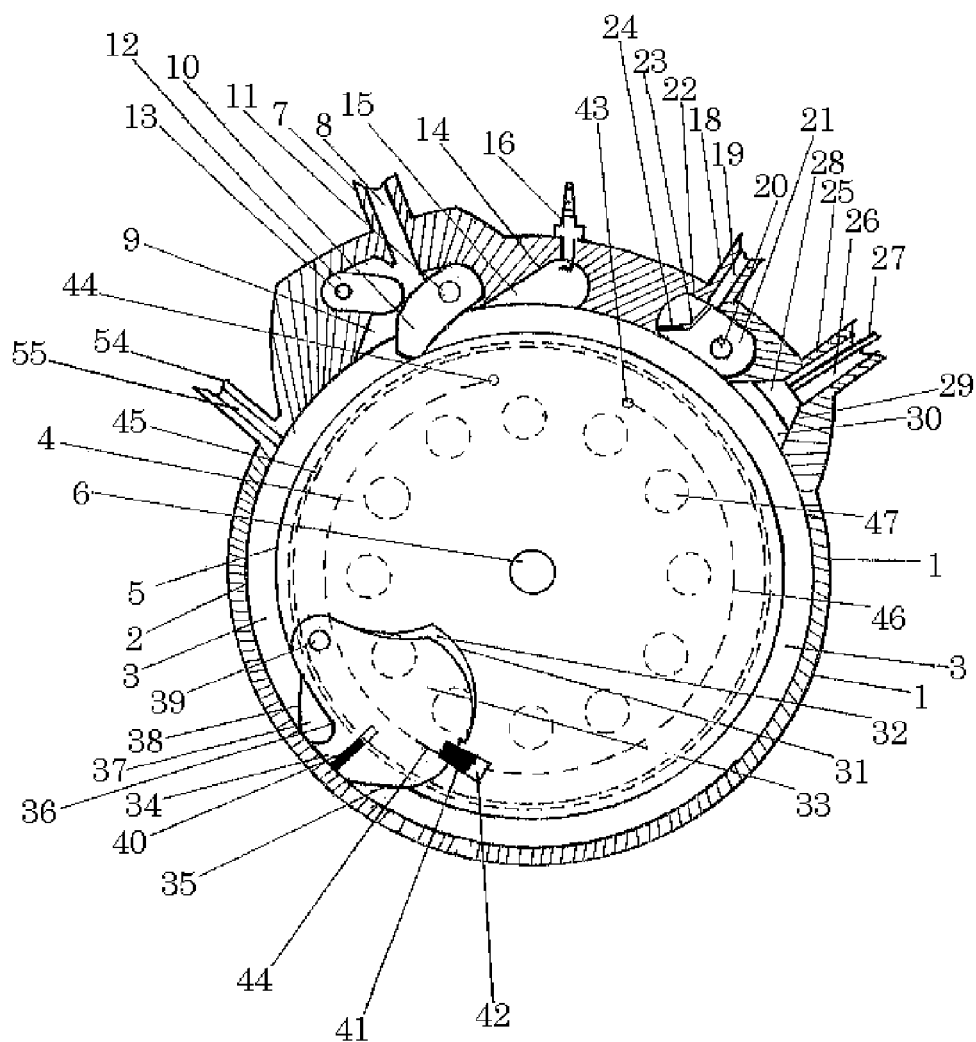
[Fig.1]

[Fig.2]
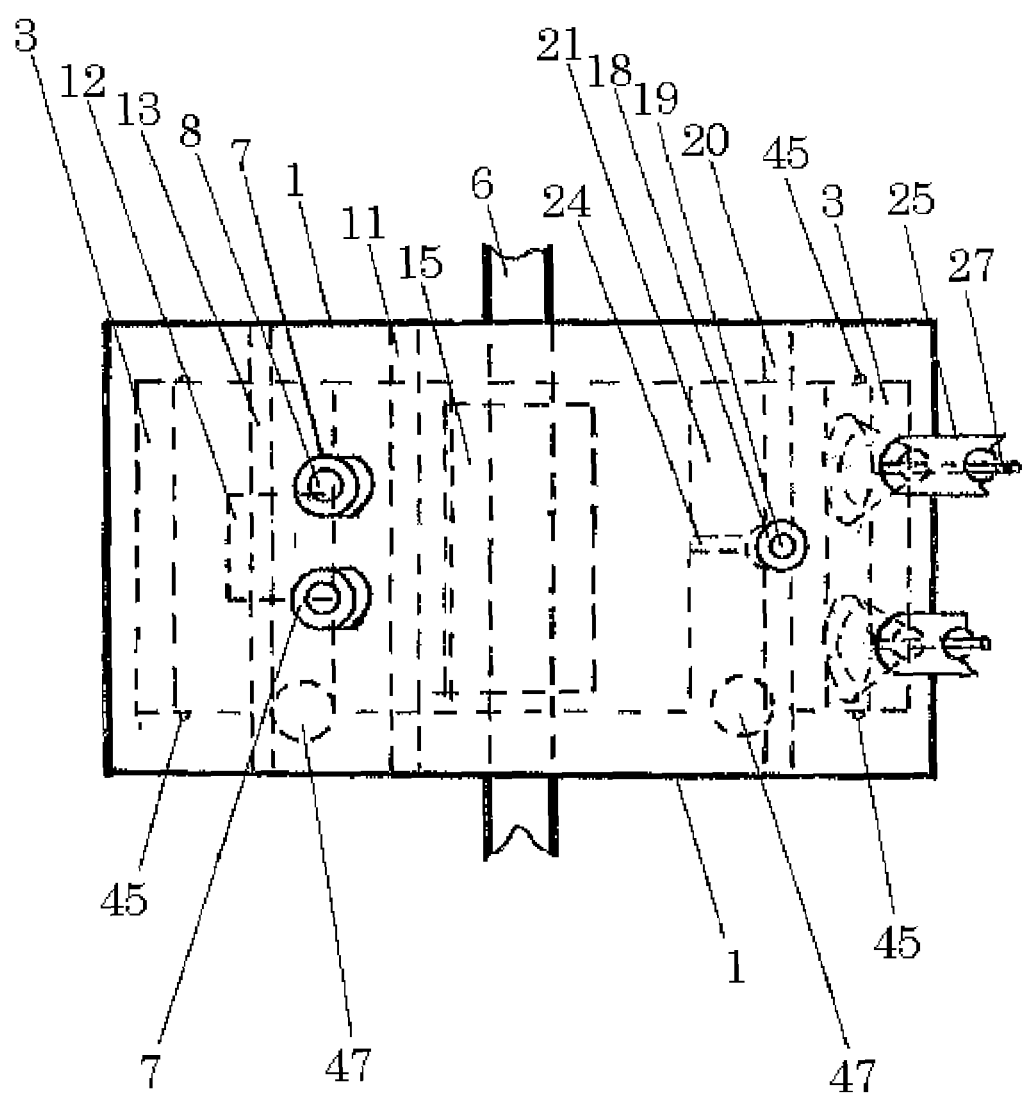

[Fig.3]
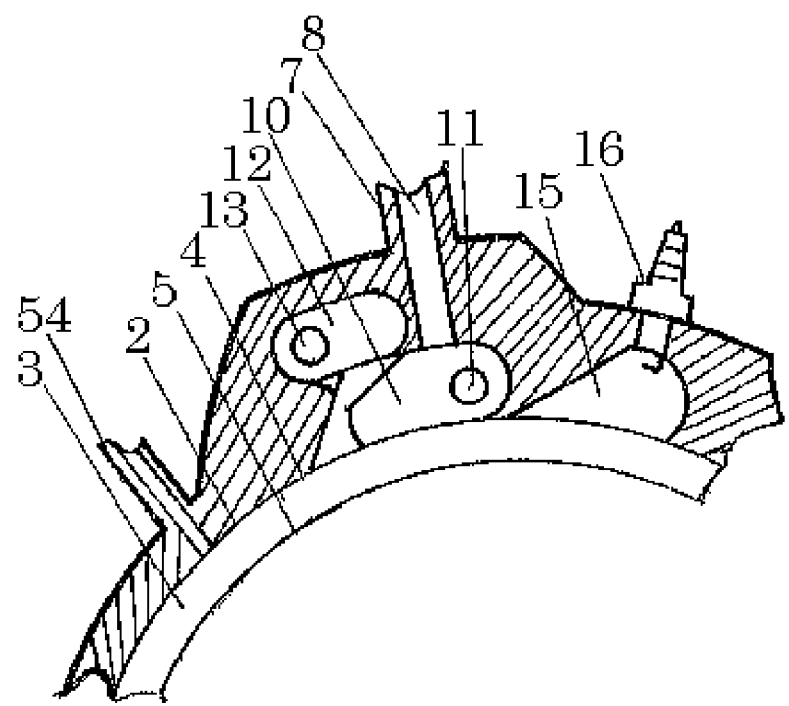

[Fig.4]
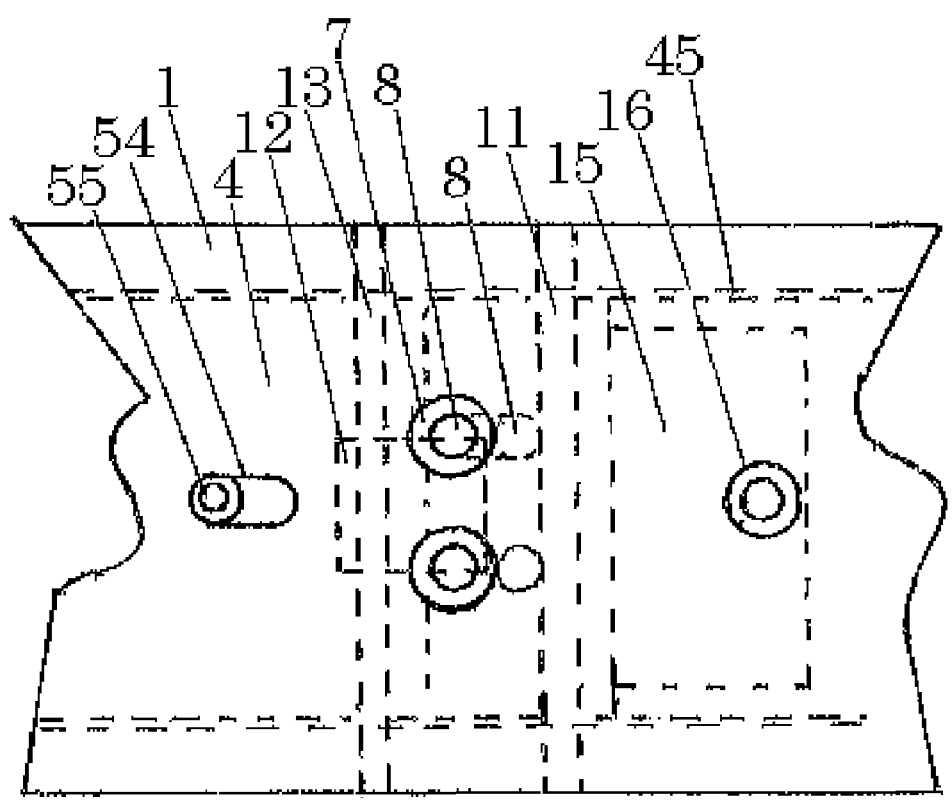

[Fig.5]
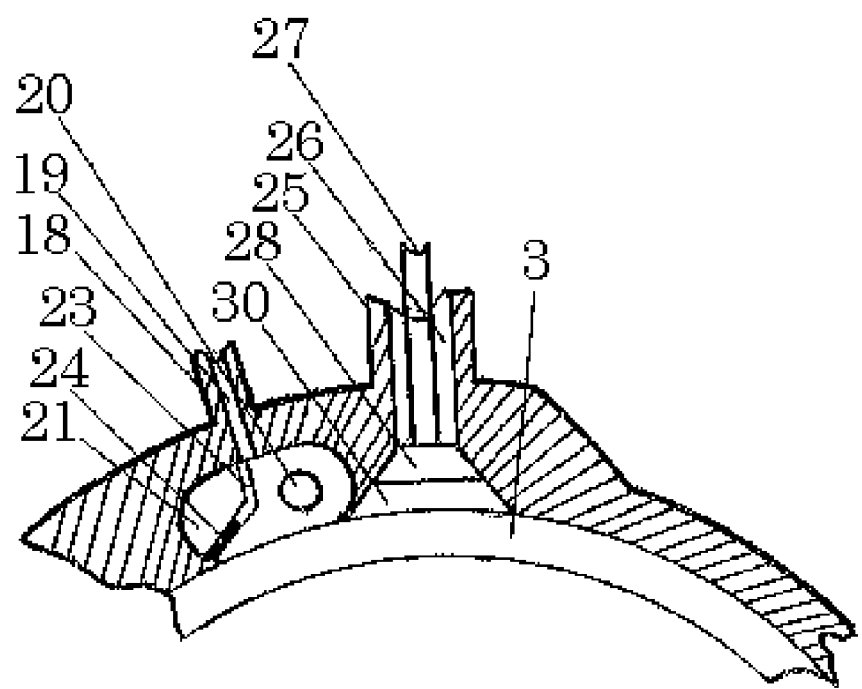

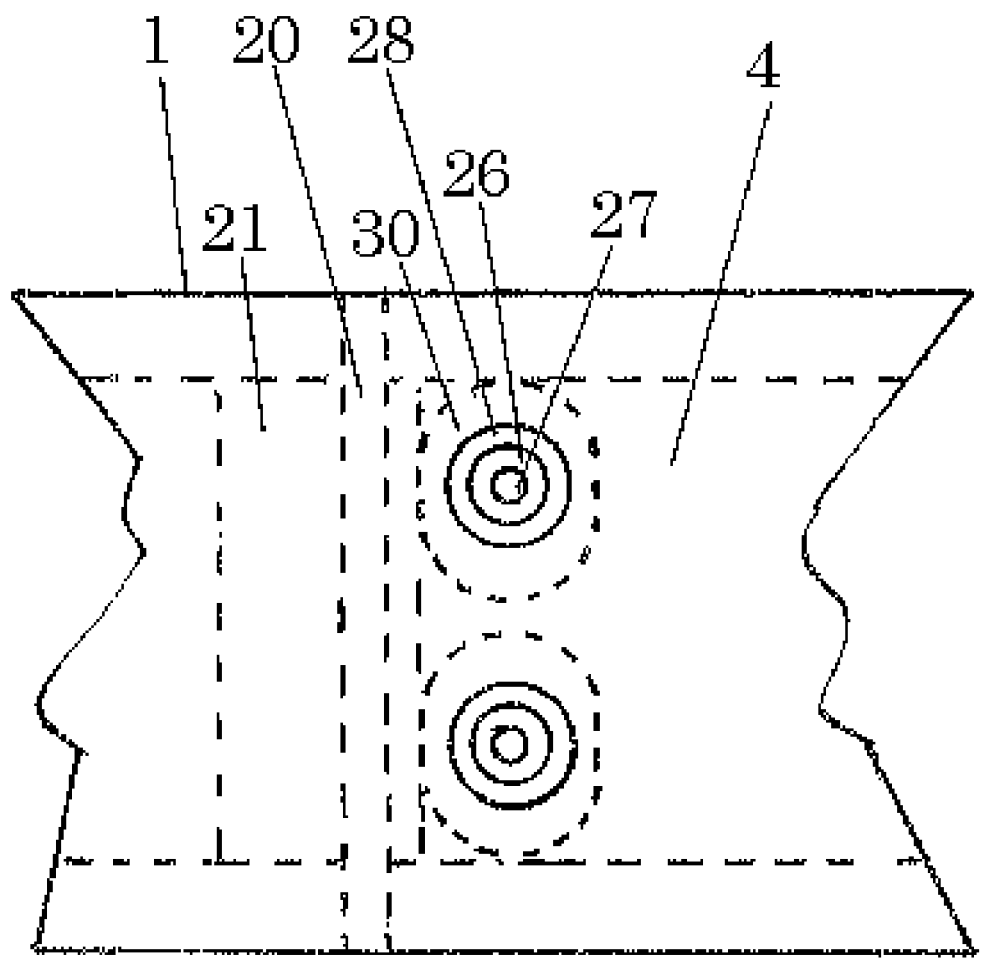
[Fig.6]

[Fig.7]
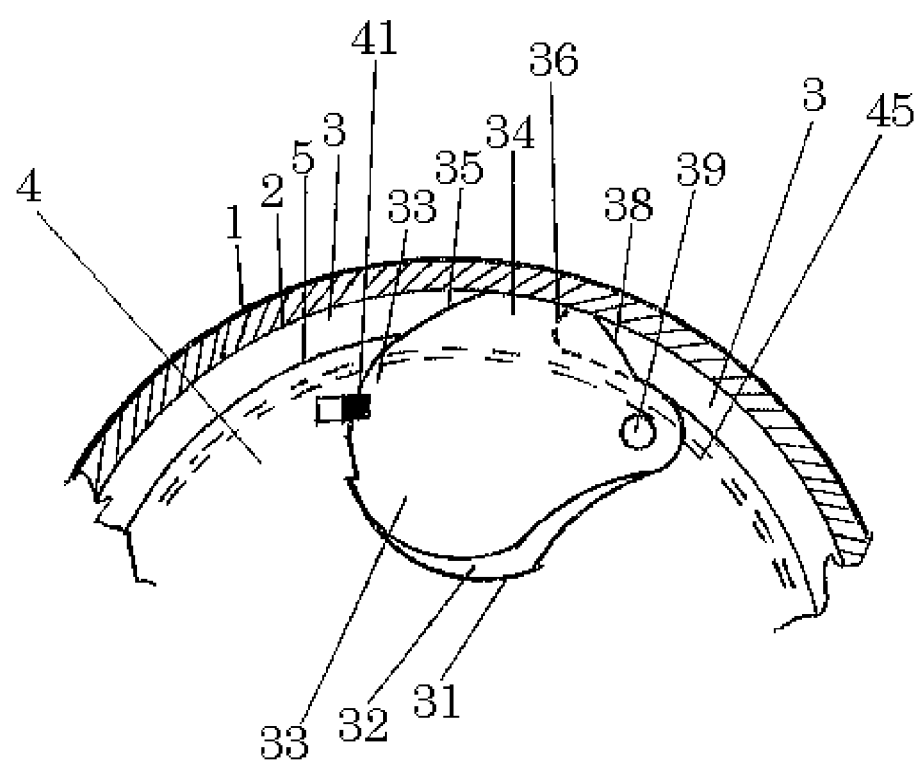

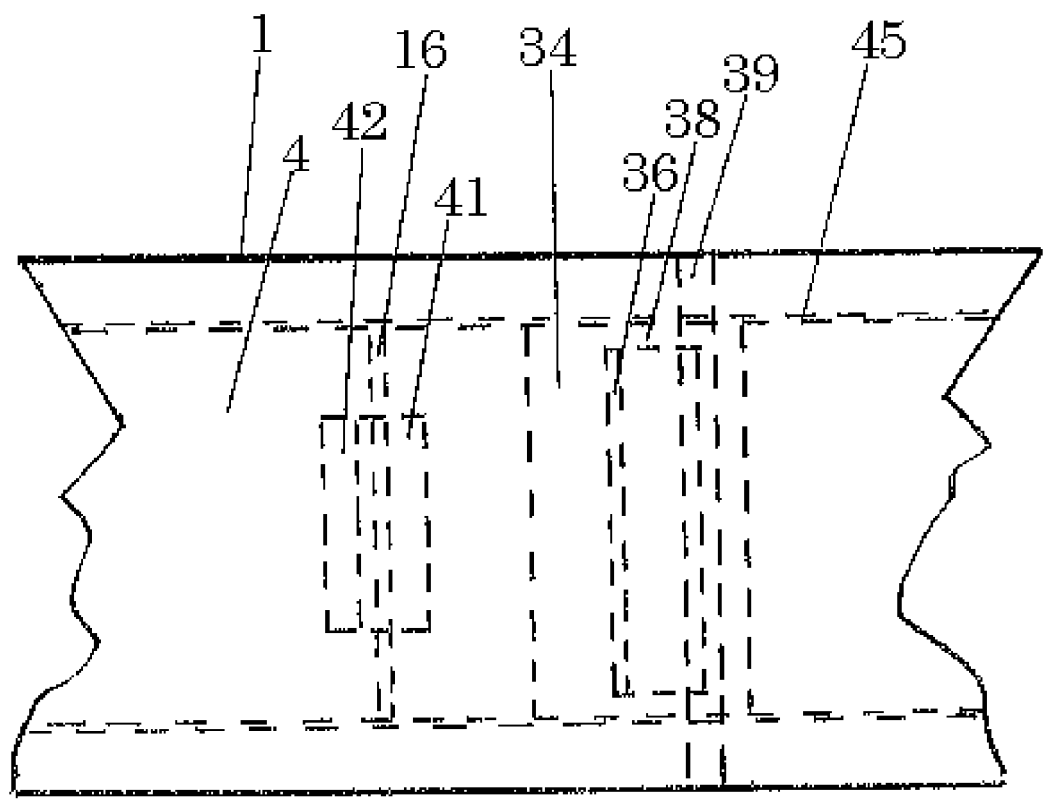
[Fig.8]

[Fig.9]
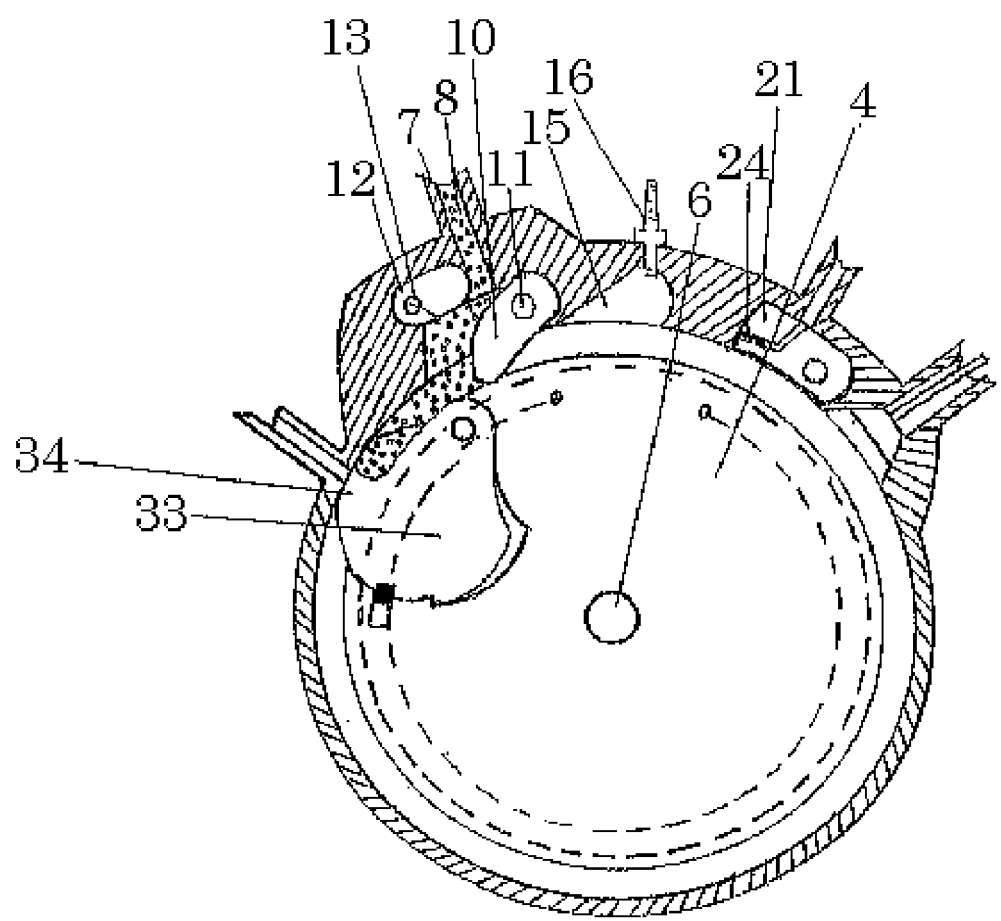

[Fig.10]
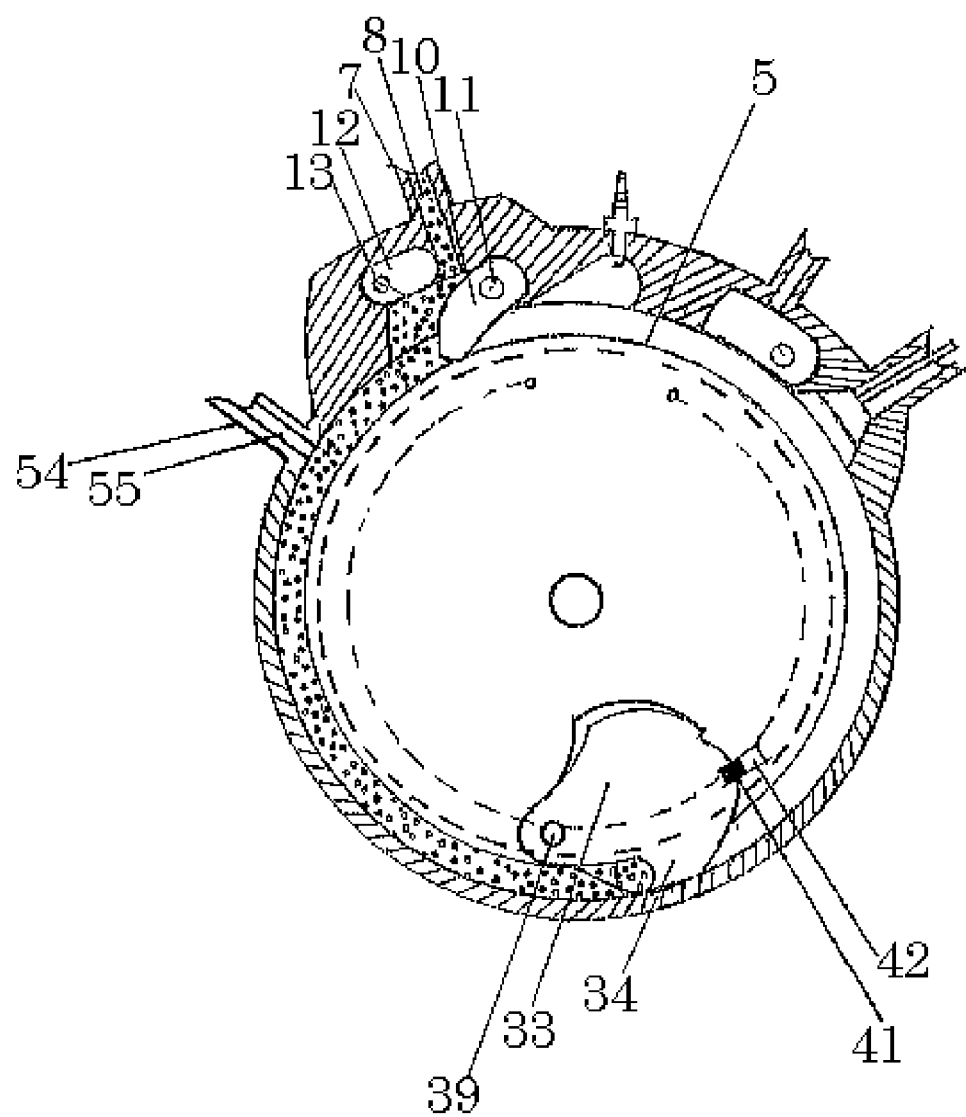

[Fig.11]
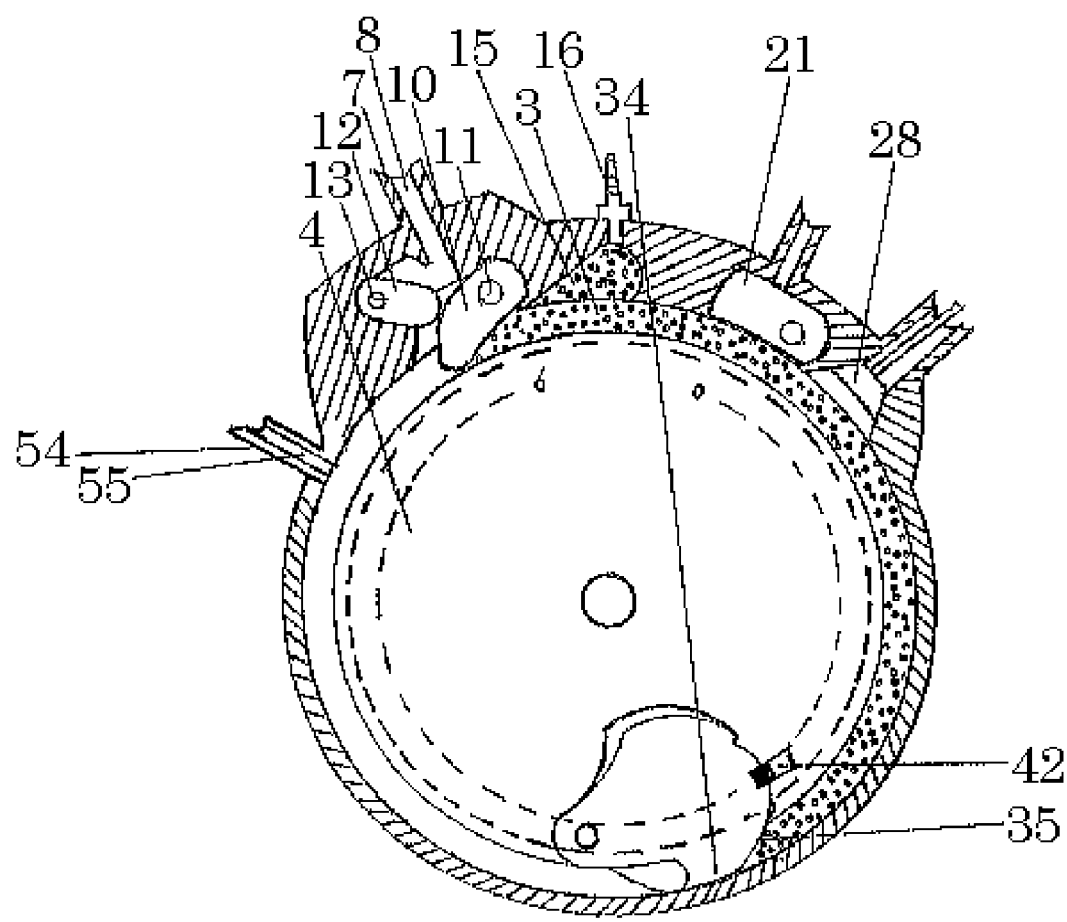

[Fig.12]
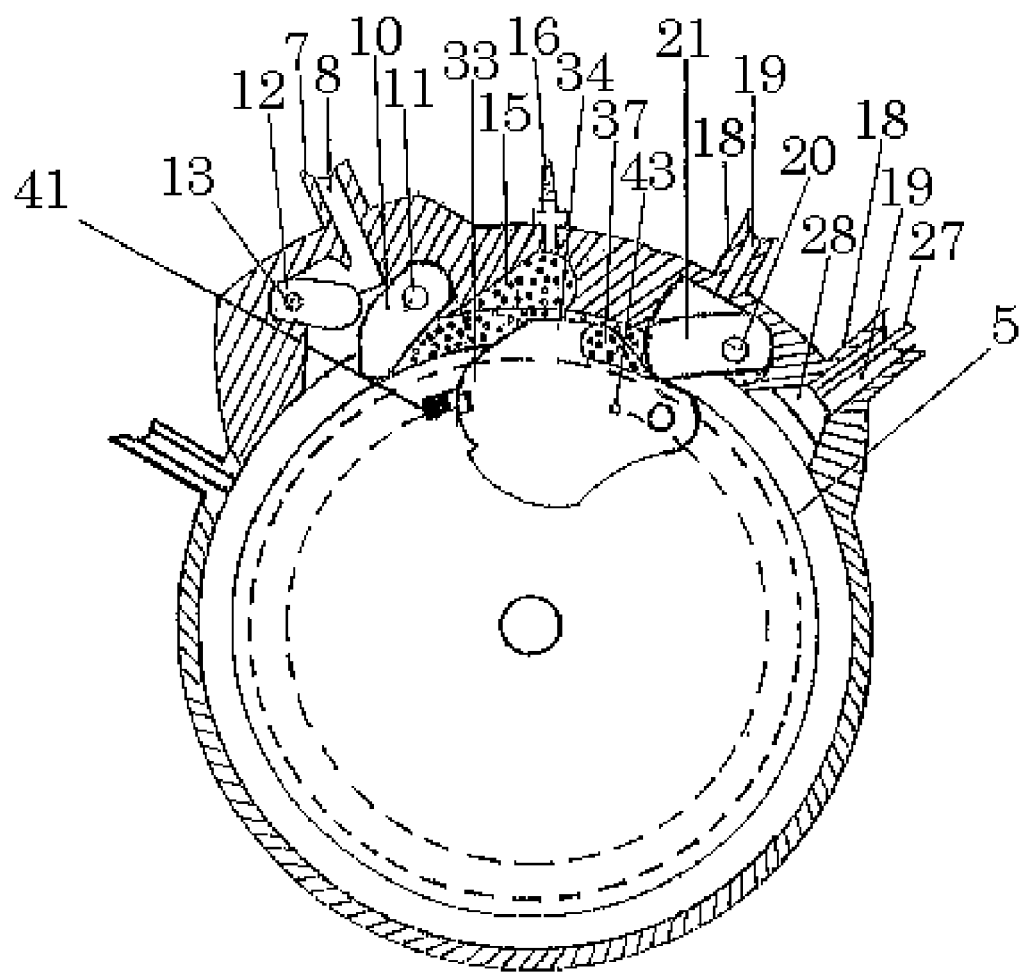

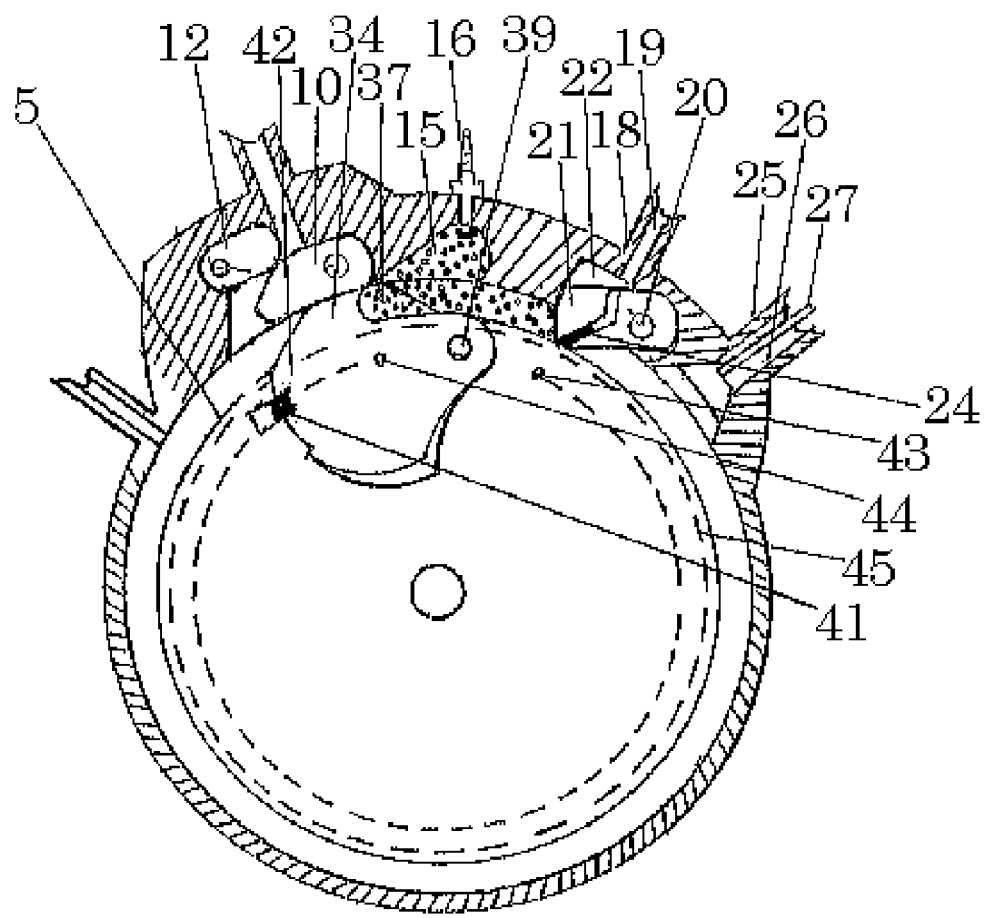
[Fig.13]

[Fig.14]
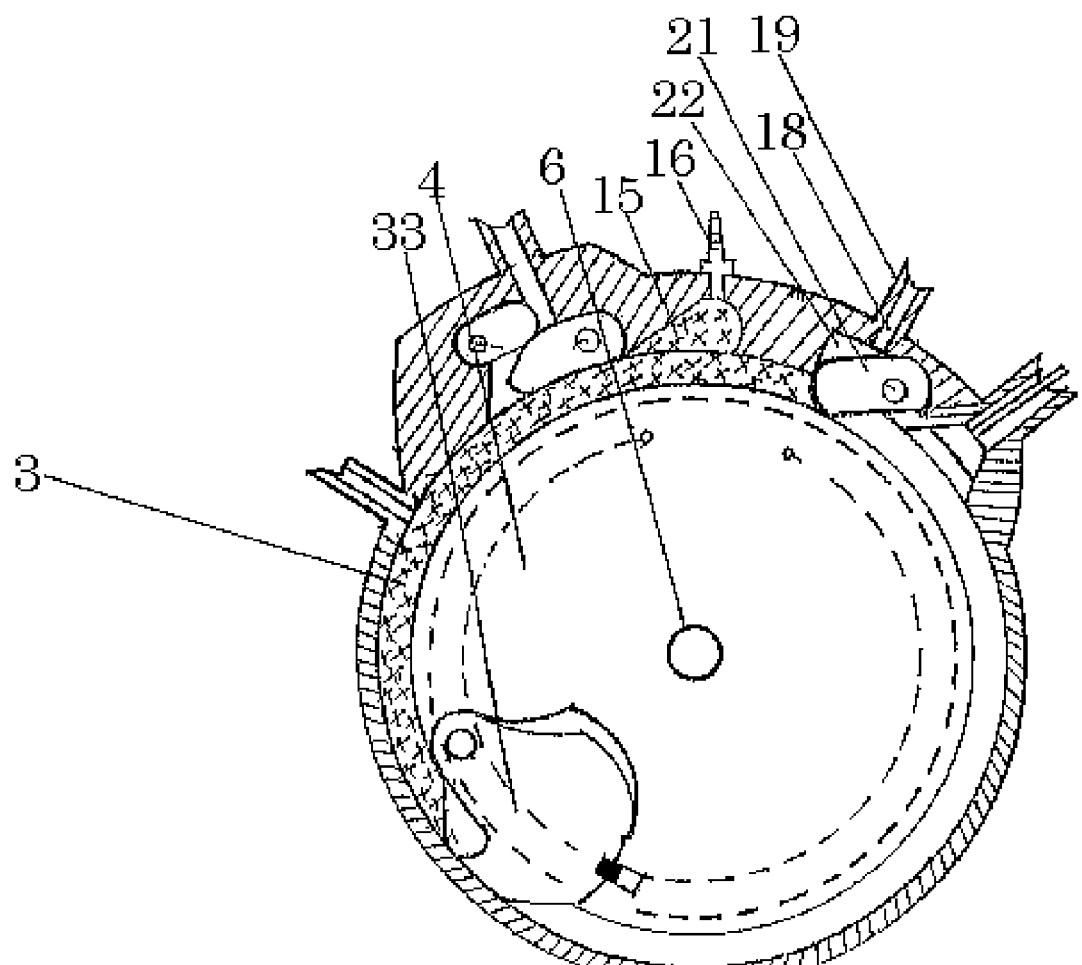

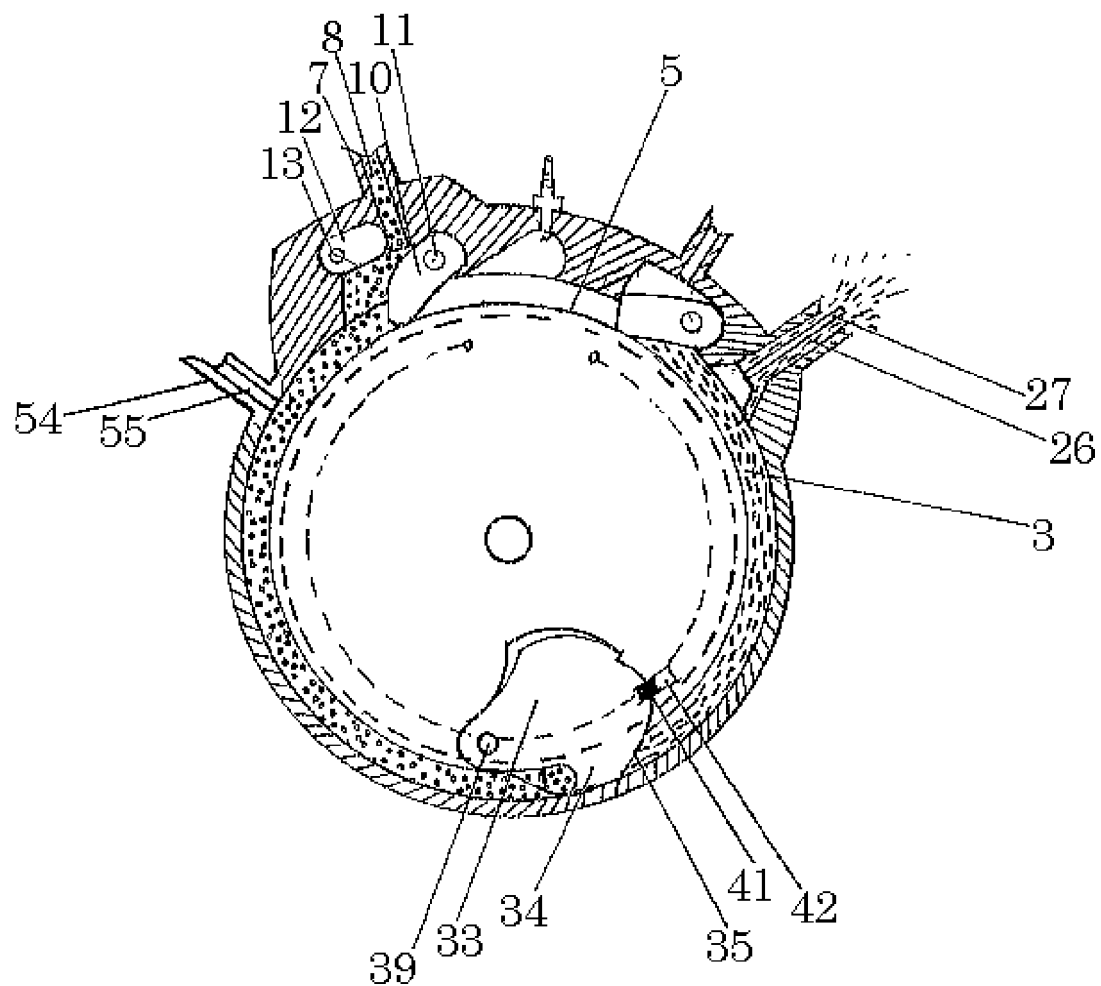
[Fig.15]

[Fig.16]
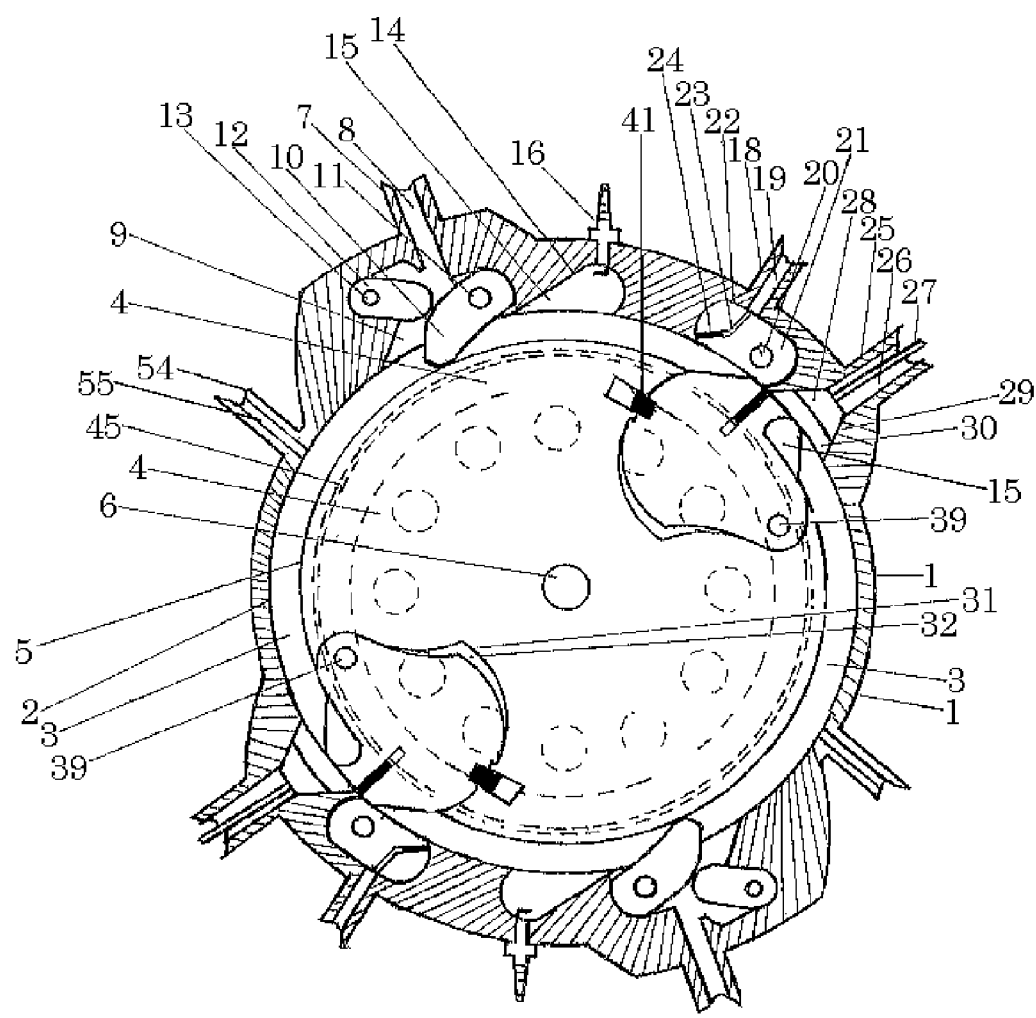

[Fig.17]
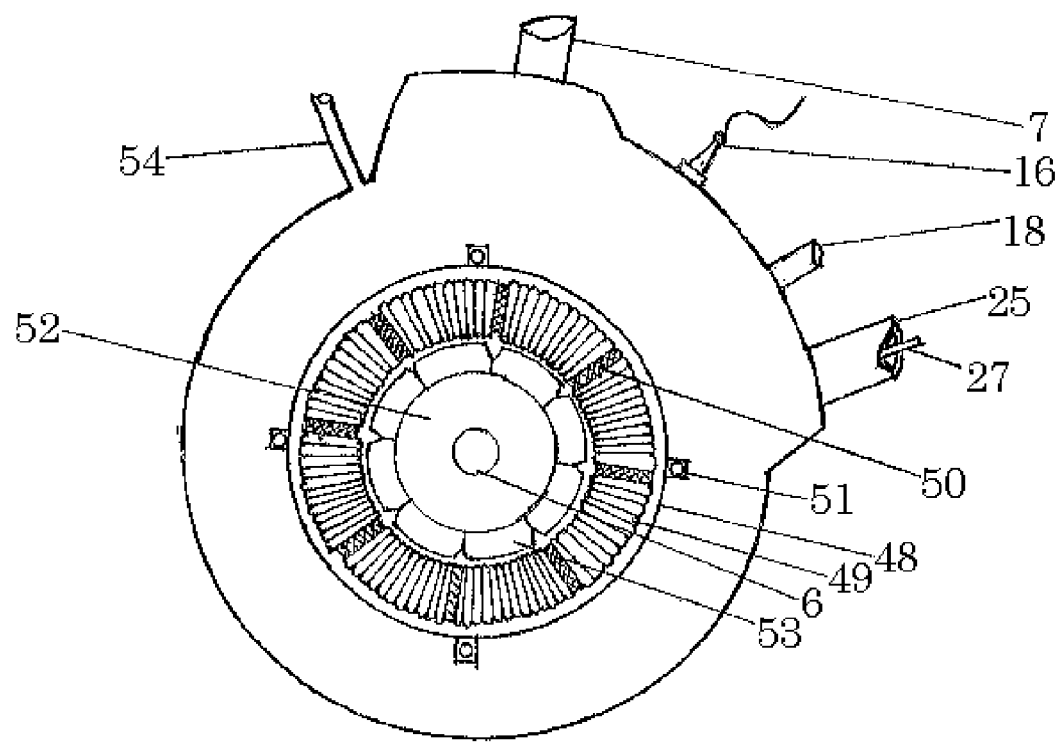

[Fig.18]
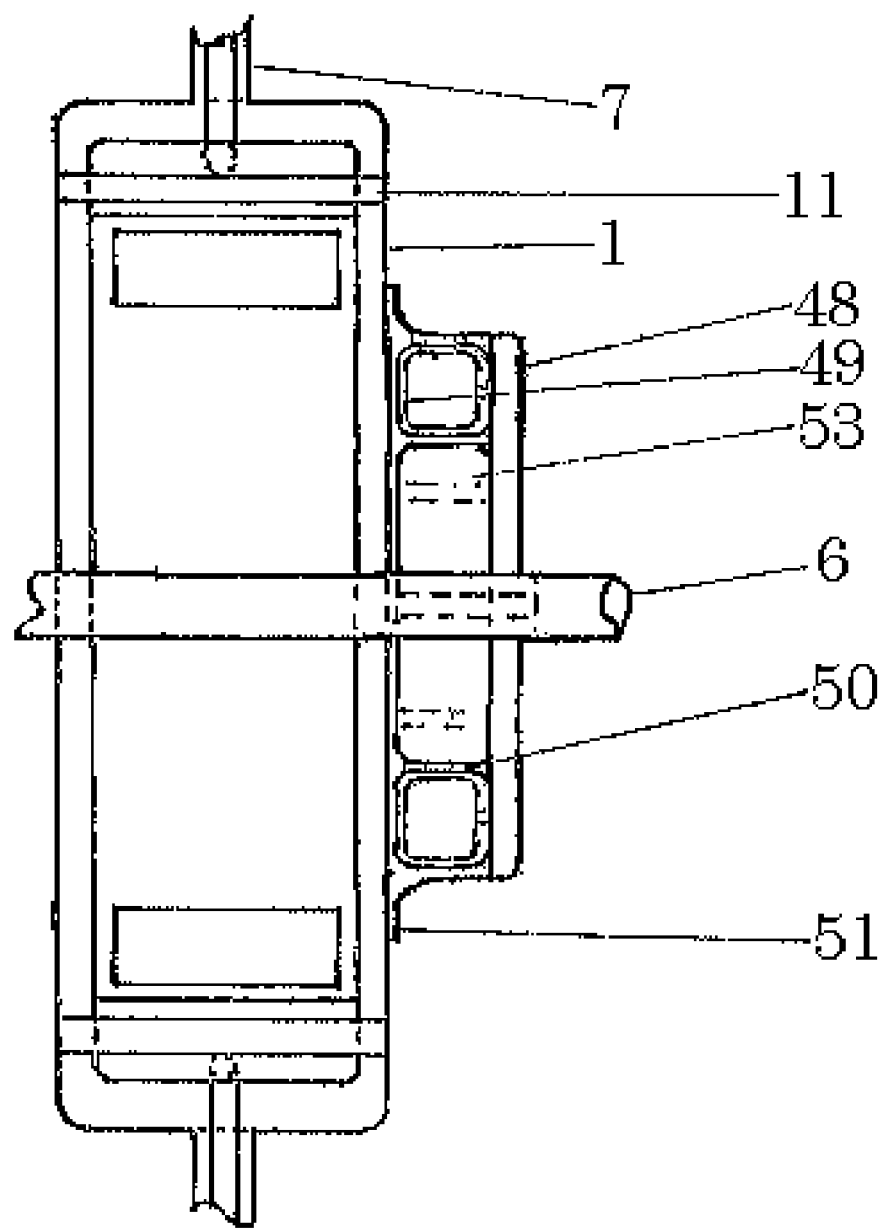

ROTARY ENGINE

BACKGROUND OF THE INVENTION

1. Field of the Invention

This invention relates to a rotary engine.

2. Description of the Related Art

Conventionally, reciprocating engines, such as automobile engines, diesel engines for ships, and the like are engines in which the reciprocating motion of a piston caused by an explosion of fuel inside the internal combustion engine is converted to rotating motion and output as power, however, the piston that moves in one direction returns in the opposite direction so energy loss occurs. In order to do away with this loss that occurs due to the reciprocating motion of the piston, a rotary engine has been developed in which a rotor is rotated inside a cylinder, and that rotation directly rotates the driveshaft and is output.

As an example of a practical rotary engine for an automobile is a rotary engine in which a triangular-shaped rotor rotates inside a cylinder having a cylindrical-shaped space and of which the three-apex section comes in contact with the surface of the peripheral wall inside the cylinder. In this rotary engine, due to the friction between that three-apex section and the peripheral wall, the durability and fuel consumption efficiency of the engine is worse than that of a reciprocating engine, and furthermore, because of its complex construction, manufacturing was difficult.

Moreover, another rotary engine is also proposed that rotates a rotor inside a cylinder. In the case of that engine, there is no valve mechanism for pressurizing the inside of the explosion chamber even though there may be an intake value mounted inside the cylinder. Also, there is an exhaust hole located directly from the explosion chamber. Therefore, when the compressed fuel explodes and the rotor rotates, the pressure inside the rotor chamber escapes and pressure is applied to the valve lift wall, so the torque is reduced by half. Furthermore, the explosion chamber adheres to the inner wall of the cylinder and the explosion pressure is completely contained inside, so it is not possible to burn the fuel completely, and it is not possible to efficiently take full advantage of the power from the explosion.

Therefore, the inventors of this invention have proposed a flywheel type of rotary engine having excellent durability, and that together with making it possible to output high horse power even from a small explosion, does away with friction loss by making rotation possible without contact with the inner wall surface of the cylinder.

This flywheel type rotary engine has an engine-output shaft in the center of a cylinder having an inner peripheral surface wall that is a circular cylindrical shape, and whose outer peripheral wall surface has an elliptical column shape of which the two convex apex sections support the shaft of the flywheel type rotor that is near the inner peripheral surface wall of the cylinder, and where two rotor explosion chambers are formed directly behind the apex sections in the direction of rotation of the rotor at two symmetrical locations about the center axis, two cylinder explosion chambers are formed in the inner peripheral surface wall of the cylinder so that they face the aforementioned explosion chambers, there are spark plugs that face the inside of the cylinder explosion chambers, and there are intake valves, pressure valves and exhaust valves so that opening and closing of the valve mechanisms are timed to match the sparks from the spark plugs, so that when the rotor and cylinder explosion chambers are in a state of facing each other, fuel is exploded causing power to be output in the direction of rotation of the rotor (see patent document 1).

Patent document 1: Japanese Patent 2000-240460 (Pg. 1, FIG. 1)

SUMMARY OF THE INVENTION

Problems to be Solved by the Invention

The flywheel type rotary engine previously proposed by the inventors of the present invention, having the construction described above, has excellent durability, and together with making it possible to output high horse power even from a small explosion, does away with friction loss by making rotation possible without contact with the inner wall surface of the cylinder, however, naturally, accomplishing further improvement of output power, reduction of friction loss, and reduction of engine size, are desirable.

Taking the above conditions into consideration, the object of the present invention is to provide a rotary engine that is capable of solving the aforementioned problems.

Means for Solving the Problems

In order to solve the aforementioned technical problems, the rotary engine of the present invention implements the following technical means.

In other words, the rotary engine according to a first claim of the invention is a rotary engine comprising: a rotor housing that is formed with a cylindrical-shaped hollow section; a flywheel rotor that is formed into a circular column shape having an outer diameter that is less than the inner diameter of the rotor housing so that a space is formed from the inner peripheral wall of the rotor housing, and is supported by the output shaft so that it is capable of rotating in the circumferential direction inside the rotor housing with the center in the radial direction of the hollow section as the center of rotation; a spark plug that is located in the rotor housing so that electric discharge is possible inside a combustion chamber, where the combustion chamber is the ring-shaped space that is formed between the inner peripheral wall of the rotor housing and the outer peripheral wall of the flywheel rotor; an intake valve that is located at a specified location inside the rotor housing further downstream in the direction of rotation of the flywheel than the location of the park plug, and is constructed such that it can partition off or open up the combustion chamber, and being linked with that partitioning operation, introduces or cuts off the flow of a fuel-air mixture to the combustion chamber; an exhaust valve that is located at a specified location inside the rotor housing further upstream in the direction of rotation of the flywheel rotor than the location of the spark plug, and is such that it can connect the combustion chamber with or cut off the combustion chamber from the outside and exhaust combustion gas that is combusted in the combustion chamber to the outside; an airtight-sealing valve that is located at a specified location inside the rotor housing between the spark plug and the exhaust valve, and is constructed so that it can partition off or open up the combustion chamber, and where together with linking that partitioning operation with the partitioning operation of the intake valve so that the fuel-air mixture is driven and compressed, is linked with the operation of the exhaust valve to exhaust the combustion gas to the outside; and a piston head that is located in part of the outer peripheral wall of the flywheel rotor so that it can be in sliding contact with the inner peripheral wall of the rotor housing or can be released from sliding contact.

The rotary engine according to a second claim of the invention is the rotary engine of claim 1 wherein a concave sub combustion chamber is formed in part of the inner peripheral wall of the rotor housing, and the spark plug is placed so that electrical discharge is possible inside that sub combustion chamber.

The rotary engine according to a third claim of the invention is the rotary engine of claim 2 wherein the tip end section of the intake valve extends toward the downstream side in the direction of rotation of the flywheel rotor, and the base end section is formed into a link shape that is supported so that it can oscillate back and forth inside the rotor housing; an intake-valve stopper is supported so that it faces the intake valve, and is such that it can oscillate back and forth inside the rotor housing so that it can hold down the intake valve from the top; an intake hole through which the fuel-air mixture flows is formed through the rotor housing so that it is open between the support section of the intake-valve stopper and the support section of the intake valve; and the intake valve and the intake-valve stopper are linked and open up or cut off the flow path of the intake hole.

The rotary engine according to a fourth claim of the invention is the rotary engine of claim 3 wherein the tip end section of the airtight-sealing valve extends toward the downstream side in the direction of rotation of the flywheel rotor, and the base end section is formed into a link shape that is supported so that it can oscillate back and forth inside the rotor housing.

The rotary engine according to a fifth claim of the invention is the rotary engine of claim 4 wherein an air hole is connected to the combustion chamber and is located at a specified location inside the rotor housing further toward the downstream side in direction of rotation of the flywheel rotor than the intake valve.

The rotary engine according to a sixth claim of the invention is the rotary engine of claim 5 wherein an exhaust hole that exhausts the combustion gas to the outside is formed through the rotor housing; and the exhaust valve moves up and down in an opening on the combustion chamber side of the exhaust hole and is formed into a conical shape that opens and closes the exhaust hole.

The rotary engine according to a seventh claim of the invention is the rotary engine of claim 6 comprising: a concave float chamber that is formed in part of the outer peripheral wall of the flywheel rotor; and a float that is stored inside the float chamber, and is constructed so that one end is supported inside that float chamber at a location on the opposite side in the direction of rotation of the flywheel, and the other end can be suspended in or removed from the float chamber; and wherein the piston head is formed so that it is integrated with the float.

The function of each of the components of the rotary engine of the present invention that is constructed as described above will be explained in the order of each process, which includes the air-intake process, compression process, combustion expansion process, and exhaust process.

(1) Air-Intake Process

For example, the torque from the cell motor rotates the output shaft, which in turn rotates the flywheel rotor. The piston head located on part of the outer peripheral wall of the flywheel rotor rotates in a state of sliding contact (adherence) with the inner peripheral wall of the rotor housing, and immediately after the piston head passes the intake valve with the partitioning of the combustion chamber in the open state, that intake valve partitions the combustion chamber and the intake valve opens, then as the piston head moves, the fuel-air mixture fills into the combustion chamber. After the piston head rotates one time and is positioned at the intake valve, the partitioning of the combustion chamber is opened, and immediately after the piston head passes the intake valve, that intake valve partitions off the combustion chamber and intake of the fuel-air mixture is finished.

(2) Compression Process

After the air-intake process has finished and the piston head has passed the intake valve, operation enters the next process, which is the compression process. In other words, when the piston head moves past the intake valve, the fuel-air mixture that has filled in between the piston head and the intake valve that partitions off the combustion chamber is compressed. Also, immediately after the piston head moves past the airtight-sealing valve, this airtight-sealing valve partitions off the combustion chamber, the fuel-air mixture is moved into the space between the intake valve and the airtight-sealing valve, and the compression process ends.

(3) Combustion Expansion Process

Next, at the same time that the airtight-sealing valve partitions off the combustion chamber, the sliding contact between the piston head and the inner peripheral wall of the rotor housing is released, and the piston head moves between the intake valve and the airtight-sealing valve. When the piston head reaches the intake valve, the intake valve that is partitioning off the combustion chamber releases the partitioning, and at the same time, sliding contact between the piston head and the inner peripheral wall of the rotor housing begins. At this time, the spark plug sparks and ignites the fuel-air mixture that is compressed between the airtight-sealing valve and the piston chamber, which causes it to combust and expand.

(4) Exhaust Process

When the fuel-air mixture that is compressed between the airtight-sealing valve and the piston chamber combusts and expands, the piston head moves the combustion chamber with great force, which causes the output shaft to rotate. Also, when the piston head reaches the airtight-sealing valve that is partitioning off the combustion chamber, the airtight-sealing valve opens the partitioning temporarily and lets the piston head pass, after which the airtight-sealing valve partitions off the combustion chamber again. When the piston head makes a complete rotation in this way and then passes the intake valve, the closed exhaust valve opens, and the combustion gas inside the combustion chamber that is in front of the piston head is exhausted to the outside. At the same time as this, after the piston head passes the intake valve, fuel-air mixture begins to be taken in behind the piston head.

Effect of the Invention

The rotary engine of the present invention comprises a circular column shaped flywheel rotor that rotates inside a rotor housing in which a cylindrical shaped hollow section is formed, and performs air intake, compression, combustion expansion (explosion) and exhaust, and since the combustion expansion is received by a piston head that is located on part of the outer peripheral wall of the flywheel rotor, it is possible to effectively perform lever action and to improve the torque. Therefore, higher power output can be expected than from a prior engine having the same amount of exhaust, or in other words, the rotary engine of this invention can be made more compact than a prior engine having the same amount of power output.

Also, the piston head rotates while having sliding contact with the inner peripheral wall of the rotor housing so friction loss is extremely small, and thus an improvement in durability and fuel consumption can be expected.

Moreover, since the flywheel rotor is formed into a circular column shape, it is possible to provide a rotary engine have very low vibration.

BRIEF DESCRIPTION OF THE DRAWINGS

FIG. 1 is a vertical cross-sectional front view of the rotary engine of a first embodiment of the invention.

FIG. 2 is a top view of the view shown in FIG. 1.

FIG. 3 is a vertical cross-sectional front view of the area around the intake valve.

FIG. 4 is a top view of the view shown in FIG. 3.

FIG. 5 is a vertical cross-sectional front view of the area around the exhaust valve.

FIG. 6 is a top view of the view shown in FIG. 5.

FIG. 7 is a vertical cross-sectional front view of the area around the float.

FIG. 8 is a top view of the view shown in FIG. 7.

FIG. 9 is a vertical cross-sectional front view of the rotary engine showing the air-intake process (1/2).

FIG. 10 is a vertical cross-sectional front view of the rotary engine showing the air-intake process (2/2).

FIG. 11 is a vertical cross-sectional front view of the rotary engine showing the compression process (1/2).

FIG. 12 is a vertical cross-sectional front view of the rotary engine showing the compression process (2/2).

FIG. 13 is a vertical cross-sectional front view of the rotary engine showing the combustion expansion process.

FIG. 14 is a vertical cross-sectional front view of the rotary engine showing the exhaust process.

FIG. 15 is a vertical cross-sectional front view of the rotary engine showing the exhaust process and air-intake process.

FIG. 16 is a vertical cross-sectional front view of the rotary engine of a second embodiment.

FIG. 17 is a front view of a generator.

FIG. 18 is a vertical cross-sectional view of the generator shown in FIG. 17.

EXPLANATION OF REFERENCE NUMBERS

1 Rotor housing
2 Inner peripheral wall of the rotor housing
3 Combustion chamber
4 Flywheel rotor
5 Outer peripheral wall of the flywheel rotor
6 Output shaft
7 Intake pipe
8 Intake hole
9 Intake chamber
10 Intake valve
11 Intake-valve shaft
12 Intake-valve stopper
13 Intake-valve stopper shaft
14 Sub-combustion chamber
15 Sub-combustion chamber
16 Spark plug
18 Airtight-sealing-valve pipe
19 Airtight-sealing-valve hole
20 Airtight-sealing-valve shaft
21 Airtight-sealing valve
22 Airtight-sealing-valve chamber
23 Airtight-sealing-valve hole
24 Compression-leakage-prevention stopper
25 Exhaust pipe
26 Exhaust hole
27 Exhaust-valve shaft
28 Exhaust valve
29 Exhaust-valve wall
30 Exhaust-valve chamber
31 Float wall
32 Float chamber
33 Float
34 Piston head
35 Piston slide
36 Piston wall
37 Piston chamber
38 Valve slide wall
39 Float shaft
40 Float-airtight-sealing stopper
41 Stopper magnet
42 Stopper-magnet chamber
43, 44 Voltage-application unit
45 Rotor ring
46 Electric wire
47 Bearing
48 Generator motor
49 Copper-wire coil
50 Insulating plate
51 Stopper
52 Rotation element
53 Magnet
54 Air pipe
55 Air hole

DESCRIPTION OF THE PREFERRED EMBODIMENTS

Next, the preferred embodiments of the rotary engine of this invention will be explained with reference to the accompanying drawings.

Embodiment 1

As shown in FIG. 1, the rotary engine of a first embodiment comprises: a rotor housing 1, flywheel rotor 4, spark plug 16, intake valve 10, exhaust value 28, airtight-sealing valve 21 and piston head 34.

As shown in FIG. 1, the rotor housing 1 is a hollow member in which a cylindrical space is formed, and there is a sub-combustion chamber 15 located in the inner peripheral wall 2 of the rotor housing 1 (the top of the space in FIG. 1) having a hole-shaped sub-combustion wall 14 that is formed so that it slopes from the upper right of the figure to the lower left of the figure (see FIG. 1 and FIG. 3).

Also, a concave intake chamber 9 is formed in the inner-peripheral wall 2 of the rotor housing 1 on the left side in the figure from the sub-combustion chamber 15, and at the top inside that intake chamber 9 there is an intake hole 8 that is continuous with the intake chamber 9 and in which there are two parallel intake pipes 7 (see FIG. 2 and FIG. 4). The intake pipes 7 are connected to a fuel-injection apparatus (not shown in the figure) and circulates a fuel-air mixture having a specified fuel-air ratio of fuel and air by way of the intake hole 8.

As shown in FIG. 1 and FIG. 5, there is a concave airtight-sealing-valve chamber 22 formed in the inner peripheral wall 2 of the rotor housing 1 on the right side in the figure from the sub-combustion chamber 15, and at the top inside that airtight-sealing-valve chamber 22, there is an airtight-sealing-valve pipe 18 having an airtight-sealing-value hole 19 that is continuous with the airtight-sealing-valve chamber 22. This airtight-sealing-valve hole 19 is a hole for pressurized air used for causing oscillating motion of an airtight-sealing valve 21 (described later) that is located such that it can oscillate inside the airtight-sealing-value chamber 22.

Moreover, there is an exhaust-valve chamber 30 formed in the inner peripheral wall 2 of the rotor housing 1 on the right side of the figure from the airtight-sealing-valve chamber 22. Furthermore, at the top inside that exhaust-valve chamber 30, there are two parallel exhaust pipes 25 having exhaust holes 26 that are continuous with the exhaust-valve chamber 30 (FIG. 2 and FIG. 6). The exhaust pipes 25 are connected to an exhaust pipe (not shown in the figures) and are such that they exhaust combustion gas to the outside.

Furthermore, there is an air pipe 54 having an air hole 55 formed in the inner peripheral wall 2 of the rotor housing on the left side of the figure from the intake chamber 9. This air pipe 54 is a hole for circulating air for making it possible for the piston head 34 (described later) to move smoothly during the compression process, and its function will be described in detail later.

The flywheel rotor 4 is formed into a circular column shape having an outer diameter that is less than the inner diameter of the rotor housing 1 so that it forms a space between it and the inner peripheral wall of the rotor housing 1, and is supported by an output shaft 6 so that it can rotate in the circumferential direction inside the rotor housing 1 with the center in the axial direction of that space as the center of rotation. A ring-shaped space is formed between the outer peripheral wall 5 of the flywheel rotor 4 and the inner peripheral wall of the rotor housing 1 in this way, and that space is the combustion chamber 3.

Also, as shown in FIG. 1 and FIG. 2, a bearing 47 is mounted between the outside surface of the flywheel rotor 4 and the inside surface of the rotor housing 1, and a rotor ring 45 (having the same function as a typical piston ring) fits around the outer surface of the flywheel rotor 4 on the outside of that bearing 47 and maintains adhesion between the outside surface of the flywheel rotor 4 and inside surface of the rotor housing 1, and with that adhesion maintained, the flywheel rotor 4 rotates smoothly inside the rotor housing 1. As shown in FIG. 2, the rotor ring 45 is fitted from both side surfaces, and as shown in FIG. 2, the bearing 47 is located on one side. Similar to the rotor ring 45, the bearing 47 can also be mounted from both sides.

Furthermore, a V-shaped concave float wall 31 is formed on part of the outer peripheral wall 5 of the flywheel 4 and forms a float chamber 32 (see FIG. 1, FIG. 7 and FIG. 8). A float 33 (described later) is supported and mounted inside this float chamber 32 so that it can oscillate, and a stopper-magnet chamber 42 in which a stopper magnet 41 that will be described later is mounted so that it can slide is formed on the inner surface of the float chamber 32 that faces a float shaft 39 that supports the float 33 so that it can oscillate.

Also, the flywheel rotor 4 is wired with electric wiring 46 comprising voltage-application units 43, 44 between the rotor ring 45 and bearing 47, and is such that it drives the stopper magnet 41 that is mounted inside the stopper-magnet chamber 42 so that it can slide.

The spark plug 16 is screwed into the top of the sub-combustion chamber 15 so that it capable of electrical discharge inside the sub-combustion chamber 15.

The tip end of the intake valve 10 extends to the downstream side in the direction of rotation of the flywheel rotor 4 (left side in FIG. 1), and the base end is supported by the intake-valve shaft 11 that is inserted through the inside of the intake chamber 9, and the tip end is formed into a link shape that is capable of oscillating back and forth. Furthermore, a link-shaped intake-valve-stopper 12 that is capable of oscillating back and forth is arranged so that its base end is supported by an intake-valve-stopper shaft 13 that is inserted through the intake chamber 9 so that it faces the intake valve 10, and so that the tip end can hold down the intake valve 10 from the top.

By operating at specified timing, both the intake valve 10 and intake-valve stopper 12 partition and divide the combustion chamber 3, or open the partitioning, as well as open up or cut off the flow path of the intake hole 8 so as to introduce or cut off the flow of the fuel-air mixture to the combustion chamber 3.

A torsion coil spring (not shown in the figure) can be mounted on the intake-valve shaft 11, and by pressing against the outer peripheral wall 5 of the flywheel rotor 4 and moving the piston head 34, can open and close the intake valve 10, or the intake-valve shaft 11 can be linked to another kind of drive mechanism (not shown in the figure) that rotates it to forcibly open and close the intake valve 10. The series of operations will be described later.

The exhaust valve 28 is connected to an exhaust-valve shaft 27, and is formed into a circular conical shape that is capable of adhering to the exhaust-valve wall 29. Also, the exhaust-valve shaft 27 that is freely inserted through the exhaust hole 26 is connected to a drive mechanism (not shown in the figure), and that drive mechanism moves the exhaust valve 28 up and down, which opens up the combustion chamber 3 to the outside and causes the combustion gas that is combusted inside the combustion chamber 3 to be discharged to the outside, or closes off the combustion chamber 3 from the outside.

The tip end of the airtight-sealing valve 21 extends to the downstream side in the direction of rotation of the flywheel 4, and the base end is supported by an airtight-sealing-valve shaft 20 that is inserted through the inside of the airtight-sealing-valve chamber 22, and the tip end is formed into a link shape that is capable of oscillating back and forth. Furthermore, airtight-sealing-valve hole 23 is formed as an opening in the bottom side of the tip end of the airtight-sealing valve 21, and a compression-leakage-prevention stopper 24 that comes in sliding contact with the outer-peripheral wall 5 of the flywheel rotor 4 fits inside this airtight-sealing-valve hole 23.

At specified timing that is interlinked with the partitioning operation of the intake valve 10, pressurized air from the airtight-sealing-valve hole 19 causes this airtight-sealing valve 21 to partition and divide the combustion chamber 3, or release that partitioning, and is such that the fuel-air mixture is moved and compressed, and being interlinked with the operation of the exhaust valve 28, is such that the combustion gas inside the combustion chamber 3 is discharged to the outside.

The piston head 34 directly receives the combustion expansion of the fuel-air mixture and is formed so that it is integrated with the float 33.

This float 33 is formed so that it corresponds with the V-shaped concave float wall 31, and one end is supported by the float shaft 39 that is inserted through the inside of the float chamber 32 at a position on the opposite side from the direction of rotation of the flywheel rotor 4, and the other end is formed with a groove that fits with the stopper magnet 41 that is mounted inside that stopper-magnet chamber 42 so that it can slide. The stopper magnet 41 and this groove fit together by wedge action, and are such that they can be fastened or unfastened.

The float 33 is formed so that when the stopper magnet 41 is unfastened from the groove formed in the float 33, the float 33 is able to move a specified amount toward the center of the flywheel rotor 4.

Also, a piston slide 35 is formed on the piston head 34 on the side of the direction of rotation so that it expands to the outer peripheral wall side of the flywheel rotor 4, and in the rear of the piston head 34, the piston wall 36 is formed into a concave shape in the direction of rotation leaving surfaces on both sides to form a piston chamber 37.

Also, The aforementioned surfaces on both sides that form the piston chamber 37 are gradually sloped downward toward the side opposite the direction of rotation, to form a valve slide wall 38.

Furthermore, a piston-head-airtight-sealing stopper 40 fits around the bulge section that is formed between the valve-slide wall 38 and the piston slide 35. When the stopper magnet 41 is engaged in the groove formed in the float 33, the piston-head-airtight-sealing stopper 40 slides along the inner peripheral wall 2 of the rotor housing 1, and when the stopper magnet 41 is disengaged from the groove formed in the float 33, the float 33 moves a specified distance toward the center of the flywheel rotor 4, and that sliding state is released.

Next, the series of operations of the rotary engine of the first embodiment constructed as described above will be explained with reference to FIG. 9 to FIG. 15 in the order of each process (air intake process, compression process, combustion expansion process, exhaust process).

(1) Air Intake Process

For example, the torque from the cell motor rotates the output shaft 6, which in turn rotates the flywheel rotor 4. The piston head 34 located on part of the outer peripheral wall 5 of the flywheel rotor 4 rotates in a state of sliding contact (adherence) with the inner peripheral wall 2 of the rotor housing 1, and immediately after the piston head 34 passes the intake valve 10 with the partitioning of the combustion chamber 3 in the open state, that intake valve 10 partitions combustion chamber 3 and the intake valve 10 opens (at this time, the intake-valve stopper 12 waits in the up position), then as the piston head 34 moves, the fuel-air mixture fills into the combustion chamber 3.

After the piston head 34 rotates one time and is positioned at the intake valve 10, the partitioning of the combustion chamber 3 is opened, and immediately after the piston head 34 passes the intake valve 10, that intake valve 10 partitions off the combustion chamber 3 and intake of the fuel-air mixture is finished (at this time, the intake-valve stopper 12 holds down the intake valve 10)(see FIG. 9 and FIG. 10).

When the piston head 34 passes the intake valve 10, the intake valve 10 opens in a state with the piston slide 35 and the valve-slide wall 38 in sliding contact with the intake valve 10.

(2) Compression Process

After the air-intake process has finished and the piston head 34 has passed the intake valve 10, operation enters the next process, which is the compression process. In other words, when the piston head 34 moves past the intake valve 10, the fuel-air mixture that has filled in between the piston head 34 and the intake valve 10 that partitions off the combustion chamber 3 is compressed (see FIG. 11).

Also, when the piston head 34 has come to the position shown in FIG. 12, the airtight-sealing valve 21 is moved downward by pressurized air coming from the airtight-sealing-valve hole 19 and comes in contact with the outer peripheral wall 5 of the flywheel rotor 4, and when this airtight-sealing valve 21 partitions off the combustion chamber 3, the fuel-air mixture is moved into the space between the intake valve 10 and the airtight-sealing valve 21, and the compression process ends (see FIG. 12).

At this time, by applying voltage from the voltage-application units 43, 44, the stopper magnet 41 slides inside the stopper-magnet chamber 42, and the stopper magnet 41 and float 33 become disengaged, after which the fuel-air mixture that is compressed by the piston head 34 presses the float 33 down into the float chamber 32. As a result, a space is formed between the inner peripheral wall 2 of the rotor housing 1 and the piston 34, and together with maintaining the movement of the piston head 34, the compressed fuel-air mixture enters into the piston chamber 37.

In this compression process, when the piston head 34 moves past the intake valve 10, negative pressure increases between the piston head 34 and the intake valve 10, which acts as a drawing force that returns the piston head 34, and by taking in air from the air hole 55, that drawing force is reduced or suppressed.

Also, in this compression process, the intake-valve stopper 12 holds down the intake valve 10 so that gas cannot escape from between the intake valve 10 and the outer peripheral wall 5 of the flywheel rotor 4.

(3) Combustion Expansion Process

At the same time that the airtight-sealing valve 21 partitions off the combustion chamber 3, the sliding contact between the piston head 34 and the inner peripheral wall 2 of the rotor housing 1 is released, and the piston head 34 moves between the intake valve 10 and the airtight-sealing valve 21, and when the piston head 34 reaches the intake valve 10, the intake valve 10 that is partitioning off the combustion chamber 3 is moved upward by the piston slide 35, which releases the partitioning, and at the same time, sliding contact between the piston head 34 and the inner peripheral wall 2 of the rotor housing 1 begins (see FIG. 13).

At this time, the voltage-application units 43, 44 apply a reverse voltage (positive pole and negative pole are switched) to the stopper magnet 41, which causes the stopper magnet 41 to slide in the float 33 groove, and engagement between the stopper magnet 41 and the float 33 begins.

Also, the spark plug 16 sparks and ignites the fuel-air mixture that is compressed between the airtight-sealing valve 21 and the piston chamber 37, which causes it to combust and expand.

At this time, the airtight-sealing valve 21 serves the function of preventing the pressure from leaking out toward the back, and furthermore, the pressurized air from the airtight-sealing-valve hole 23 presses the compression-leakage-prevention stopper 24 so that it comes in contact with the outer peripheral wall 5 of the flywheel rotor 4 and prevents the leakage of pressure.

(4) Exhaust Process

When the fuel-air mixture that is compressed between the airtight-sealing valve 21 and the piston chamber 37 combusts and expands, the piston head 34 rotates and moves the combustion chamber 3 with great force, which causes the output shaft 6 to rotate (see FIG. 14). Also, when the piston head 34 reaches the airtight-sealing valve 21 that is partitioning off the combustion chamber 3, the airtight-sealing valve 21 opens the partitioning temporarily and lets the piston head 34 pass, after which the airtight-sealing valve 21 partitions off the combustion chamber 3 again.

When the piston head 34 makes a complete rotation in this way and then passes the intake valve 10, the closed exhaust valve 28 opens, and the combustion gas inside the combustion chamber 3 that is in front of the piston head 34 is exhausted to the outside. At the same time as this, after the piston head 34 passes the intake valve 10, fuel-air mixture begins to be taken in behind the piston head 34 (see FIG. 15).

By performing this air-intake process, compression process, combustion expansion process, and exhaust process in succession, the output shaft 6 rotates and outputs power.

In this way, the rotary engine of this first embodiment comprises a circular column shaped flywheel rotor 4 that rotates inside a rotor housing 1 in which a cylindrical hollow section is formed, and performs air intake, compression, combustion expansion (explosion) and exhaust, and since the combustion expansion is received by a piston head 34 that is located on part of the outer peripheral wall 5 of the flywheel rotor 4, it is possible to effectively perform lever action and to improve the torque. Therefore, higher power output can be expected than from a prior engine having the same amount of exhaust, or in other words, the rotary engine of this first embodiment can be made more compact than a prior engine having the same amount of power output.

Also, the piston head 34 rotates while having sliding contact with the circular-shaped inner peripheral wall 2 of the rotor housing 1 so friction loss is extremely small, and thus an improvement in durability and fuel consumption can be expected.

Moreover, since the flywheel rotor 4 is formed into a circular column shape, it is possible to provide a rotary engine having very low vibration.

Embodiment 2

As shown in FIG. 16, the rotary engine of a second embodiment of the invention is an embodiment in which a pair of each of the components of the first embodiment such as the intake valves 10, spark plugs 16, airtight-sealing valves 21, exhaust valves 28, piston heads 34 and air holes 55 are arranged so that they face each other, and a pair of each component is installed in the rotor housing 1 and flywheel rotor 4, so the basic construction is the same as that of the first embodiment with only the shape being different, so the same reference numbers are used as in the first embodiment and a detailed explanation is omitted.

In the case of the rotary engine of this second embodiment, when half is in the air-intake process, for example, the other half is also in the air-intake process, so that the process of both halves is the same.

With the rotary engine of this second embodiment, each of the components is arranged so that it faces its counterpart, so it is possible to provide a rotary engine having very low vibration.

Embodiment 3

This third embodiment is an embodiment in which the rotary engine of the first embodiment or second embodiment is used. In other words, it is an embodiment in which the rotary engine of the first embodiment or second embodiment is linked with a generator motor 48 to form a generator.

As shown in FIG. 17 and FIG. 18, this generator uses the output shaft 6 of the rotary engine of the first embodiment or second embodiment as the input shaft of the generator motor 48, and the rotary engine and generator motor 48 are connected by way of a stopper 51.

In other words, on the inside of a copper wire coil 49 that is arranged in a ring shape in the frame of the generator motor 48 by way of an insulating plate 50, a rotating element 52 having a magnet 53 formed around it is attached to the output shaft 6, and as the output shaft 6 of the rotary engine rotates, the rotating element 52 having the magnet 53 formed around it rotates, which generates a magnetic induced current to generate electricity.

By using the output shaft 6 of the rotary engine as the input shaft of a generator motor 48 in this way, there is no need to use parts such as a belt, and it is possible to make the rotary engine of this embodiment more compact, so it is possible to provide an extremely compact generator.

Embodiments of the rotary engine of the present invention were explained above, however, the embodiments explained above are the preferred embodiments of the invention, and the invention is not limited to these embodiments, and these embodiments can be changed with in the scope of the invention.

What is claimed is:

1. A rotary engine comprising:
   a rotor housing that is formed with a cylindrical-shaped hollow section;
   a flywheel rotor that is formed into a circular column shape having an outer diameter that is less than the inner diameter of said rotor housing so that a ring-shaped space is formed from the inner peripheral wall of said rotor housing, and is supported by an output shaft so that it is capable of rotating in the circumferential direction inside said rotor housing with the center of said hollow section as the center of rotation;
   a spark plug that is located in said rotor housing so that electric discharge is possible inside a combustion chamber, where said combustion chamber is said ring-shaped space that is formed between the inner peripheral wall of said rotor housing and the outer peripheral wall of said flywheel rotor;
   an intake valve that is located at a specified location inside said rotor housing further downstream in the direction of rotation of said flywheel rotor than the location of said spark plug, and is constructed such that said intake valve can partition off said combustion chamber during an intake valve partitioning operation and open up said combustion chamber during non-partitioning intake valve operations, said intake valve introduces or cuts off the flow of a fuel-air mixture to said combustion chamber;
   an exhaust valve that is located at a specified location inside said rotor housing further upstream in the direction of rotation of said flywheel rotor than the location of said spark plug, and is such that said exhaust valve can connect said combustion chamber with or cut off said combustion chamber from the outside and exhaust combustion gas that is combusted in said combustion chamber to the outside;
   an airtight-sealing valve that is located at a specified location inside said rotor housing between said spark plug and said exhaust valve, and is constructed so that said airtight-sealing valve can partition off said combustion chamber during an airtight-sealing valve partitioning operation and open up said combustion chamber during a non-partioning air-tight sealing valve operation, and where said air-tight sealing valve partitioning operation is linked with the intake valve partitioning operation so that said fuel-air mixture is moved and compressed, said airtight sealing valve is linked with said exhaust valve to exhaust said combustion gas to the outside; and a piston head that is located in part of the outer peripheral wall of said flywheel rotor so that said piston head oscillates between being in sliding contact with the inner peripheral wall of said rotor housing and being released from sliding contact.

2. The rotary engine of claim 1 wherein a concave sub combustion chamber is formed in part of the inner peripheral wall of said rotor housing, and said spark plug is placed so that electrical discharge is possible inside that sub combustion chamber.

3. The rotary engine of claim 2, wherein the tip end section of said intake valve extends toward the downstream side in the direction of rotation of said flywheel rotor, and the base end section is formed into a link shape that is supported so that it can oscillate back and forth inside said rotor housing;

an intake-valve stopper is supported so that it faces said intake valve, and is such that it oscillates back and forth inside said rotor housing so that it holds down said intake valve from the top;

an intake hole through which said fuel-air mixture flows is formed through said rotor housing so that it is open between an intake-valve stopper support section and an intake valve support section; and said intake valve and said intake-valve stopper are linked to open up or cut off the flow path of said intake hole.

4. The rotary engine of claim 3 wherein the tip end section of said airtight-sealing valve extends toward the downstream side in the direction of rotation of said flywheel rotor, and the base end section is formed into a link shape that is supported so that it oscillates back and forth inside said rotor housing.

5. The rotary engine of claim 4 wherein an air hole is connected to said combustion chamber and is located at a specified location inside said rotor housing further toward the downstream side in direction of rotation of said flywheel rotor than said intake valve.

6. The rotary engine of claim 5 wherein an exhaust hole that exhausts said combustion gas to the outside is formed through said rotor housing; and said exhaust valve moves up and down in an opening on the combustion chamber side of the exhaust hole and is formed into a conical shape that opens and closes the exhaust hole.

7. The rotary engine of claim 6 comprising:

a concave float chamber that is formed in part of the outer peripheral wall of said flywheel rotor; and a float that is stored inside the float chamber, and is constructed so that one end is supported inside that float chamber at a location on the opposite side in the direction of rotation of said flywheel, and the other end can be suspended in or removed from said float chamber; and wherein said piston head is formed so that it is integrated with said float.

* * * * *